(12) United States Patent
Romine

(10) Patent No.: US 6,442,604 B2
(45) Date of Patent: Aug. 27, 2002

(54) INCREMENTAL ARCHIVING AND RESTORING OF DATA IN A MULTIMEDIA SERVER

(75) Inventor: Jeff E. Romine, Sandy, UT (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/002,138

(22) Filed: Dec. 31, 1997

Related U.S. Application Data

(60) Provisional application No. 60/041,522, filed on Mar. 25, 1997.

(51) Int. Cl.[7] ............................................. G06F 15/16
(52) U.S. Cl. ........................................... 709/219; 348/7
(58) Field of Search ................................ 395/601, 427, 395/155, 825; 707/8; 341/107; 369/85, 33; 709/219, 217; 711/162; 345/327; 348/7, 12, 8; 702/231, 202; 386/125, 34; 360/32; 725/91; 370/380

(56) References Cited

U.S. PATENT DOCUMENTS

| | | | | |
|---|---|---|---|---|
| 4,755,889 A | * | 7/1988 | Schwartz | 360/32 |
| 4,811,325 A | * | 3/1989 | Sharples, Jr. et al. | 369/85 |
| 4,989,191 A | * | 1/1991 | Kuo | 369/33 |
| 5,508,812 A | * | 4/1996 | Stevenson et al. | 386/34 |
| 5,535,322 A | * | 7/1996 | Hetch | 395/155 |
| 5,539,660 A | * | 7/1996 | Blair et al. | 370/380 |
| 5,583,500 A | * | 12/1996 | Allen et al. | 341/107 |
| 5,611,066 A | * | 3/1997 | Keele et al. | 395/427 |
| 5,740,465 A | * | 4/1998 | Matsunami et al. | 395/825 |
| 5,745,756 A | * | 4/1998 | Henley | 707/204 |
| 5,764,972 A | * | 6/1998 | Crouse et al. | 395/601 |
| 5,815,146 A | * | 9/1998 | Youden et al. | 345/327 |
| 5,857,187 A | * | 1/1999 | Uenoyama et al. | 707/8 |
| 5,870,553 A | * | 2/1999 | Shaw et al. | 709/219 |
| 5,926,826 A | * | 7/1999 | Blumneau | 711/162 |
| 5,926,836 A | * | 7/1999 | Blumenau | 711/162 |
| 6,018,765 A | * | 1/2000 | Durana et al. | 709/217 |
| 6,188,428 B1 | * | 2/2001 | Koz et al. | 348/7 |

FOREIGN PATENT DOCUMENTS

| | | | | |
|---|---|---|---|---|
| WO | WO9316557 | | 8/1993 | H04N/7/173 |
| WO | WO963357 | | 10/1996 | H04N/9/804 |

OTHER PUBLICATIONS

Kinugasa et al. A Video Pre/Post–Processing LSI for Video Capture IEEE Jun. 1996.*
Multimedia & telecommuncations 1997–2002: Perspectives and Recommendations.*
Rajapakshe et al, Video on Demand, 1995.*

* cited by examiner

Primary Examiner—Mark H. Rinehart
Assistant Examiner—Thong Vu
(74) Attorney, Agent, or Firm—Michael E. Belk

(57) ABSTRACT

In a video server, multimedia data for a production is archived with data blocks for a video disk file and data blocks for audio disk files and data blocks for auxiliary disk files all intermixed together in a single tape file, in approximately the same order required for producing a multimedia data stream. During restoring of the production, as the disk files are being copied to disk storage systems from the tape file, the data may be retrieved from the same disk files and played as a multimedia data stream as soon as enough information is available in the files to form the stream. Disk files are striped across a multitude of disk files systems, by a commutator and a multitude of input/output units share access to all the files in all the disk file systems, for example, using a periodically switching round robin scheme or more complex scheduling. Also, during restoration, the same input/output unit of the server that is copying the data from the tape file to the disk drive may be is used to play a multimedia data stream for the production and simultaneously other input/output units of the server are able to play multimedia data streams for the same production from those portions of the disk files for the production that have already been restored.

3 Claims, 5 Drawing Sheets

INCREMENTAL ARCHIVING AND RESTORING OF DATA IN A MULTIMEDIA SERVER

Applicant claims the benefit of his U.S. provisional patent application, Ser. No. 60/041,522, filed Mar. 25, 1997.

FIELD OF THE INVENTION

This invention relates to data archiving and restoring and relates most closely to the field of multimedia data servers.

BACKGROUND

The invention herein involves computer systems. A computer system normally includes a central processing unit (CPU), a permanent memory unit, a fast memory unit, input and/or output (I/O) units, storage units, and a user interface. Programs contained in the memory, control the operation of the CPU to operate the computer. Whenever the computer is started, the CPU is initially controlled by a small program contained in the permanent memory. This startup program loads an operating system and any other necessary programs and data from files in the storage units into the fast memory. The CPU is able to alter any data contained in fast memory and control the I/O units to transfer data between the fast memory and peripherals such as the storage units, printers and user interface components. During operation, all or parts of data files are loaded into the fast memory. The contents of the data files are then changed, and the new versions of the data files are saved back into storage.

Memory generally refers to electronic information storage. When discussing memory or storage, both programs and data files are referred to collectively as either "data" or "information". There are two main type of memory: read only memory (ROM) and random access memory (RAM). RAM tends to be much faster than ROM, but also tends to be highly volatile, meaning that it must be regularly written to in order to prevent data loss. ROM, on the other hand, is permanent, so that any data stored in ROM is available when the computer is first turned on.

There are many different types of ROM. Some kinds of ROM are created with an unchangeable program built in. Programmable ROM (PROM), on the other hand, can be written to, but this usually requires high voltage, and may be difficult to erase (requiring, for example, ultraviolet light). Permanent memory may also be rewritable memory such as electrically erasable ROM (EEPROM), battery backed SRAM, or flash memory.

Faster, more volatile types of memory are known as random access memory (RAM). Types of RAM include static RAM (SRAM), in which data is stored using circuits with several transistors, and dynamic RAM (DRAM), in which information is stored as charges in capacitors. The capacitors of DRAM must be regularly recharged to prevent data loss. The data stored in fast memory is usually lost when the system is turned off. Random access refers to the fact that any word i.e. 2 or 4 bytes (1 byte equals 8 bits of data), of the memory can be arbitrarily selected and immediately read or written to in one operation at any time without reading through the rest of memory. Note that permanent memory (ROM) is also random memory in this sense.

ROM is normally built into a motherboard of the computer. Fast memory is commonly provided on small boards that are mounted in memory slots on the motherboard of the computer. Flash memory PC cards are available that insert into PCMCIA slots commonly found in laptop computers, and small computer systems often use ROM cartridges especially for computer games.

Storage usually refers to units which contain computer media onto which the data and programs are stored. The computer media may be magnetic media in which a layer of plastic is coated with a layer of metal alloy oxide (e.g. iron rust) which is magnetic but not electrically conducting. Bits of data may be written to such magnetic media by magnetizing the particles at a storage point on the layer in a particular direction by controlling current to a magnetic write head moving closely over the point. Data may be read from magnetic media by detecting the effect of the magnetization on electrical current output from a magnetic read head. Alternately the media may be optical media in which bits may be written by directing a higher power laser beam at a point in a layer of the media to change the reflectivity of the layer at that point and read by detecting the amount of reflected light when a lower power laser is directed at the point on the layer. Some storage devices, such as hard disk drives, include a fixed media which can not be removed. In other devices, such as floppy disk drives, tape drives, and optical disk drives, the media can easily be removed and replaced by other media containing different programs or data files.

Some digital storage devices, such as hard disk drives and some types of optical disk drives, provide high speed access to any arbitrary individual block of data in the media of the device. This capability is referred to as random access. Unlike memory, no storage device allows random access to individual words (e.g. 2 or 4 bytes), but random access storage devices do allow relatively fast access to individual blocks (e.g. 512 bytes).

Other types of digital storage devices, such as digital tape drives, only allow access to blocks of data in a sequence. For example, a tape may have to be wound for hundreds of meters in order to reach a particular block of data. Thus, these types of storage device are only useful for accessing large sequential sections of data, since random access to individual blocks is either not available or too slow for practical use. Such devices are referred to as sequential access storage. Common sequential access devices have removable media which is relatively inexpensive, allowing the storage of large amounts of data at relatively low cost.

Some storage drives are built-in or internal and require opening the computer to install or remove. Some other storage devices are external and plug into ports of the computer to be easily installed and removed. High performance systems often have hard drives installed in enclosures that slide into internally mounted frames for convenient replacement.

The unreliability of high speed, random access storage devices is a major problem in data storage. Certain mechanical parts of a storage drives, such as positioning motors and bearings, are not nearly as reliable as solid state devices. In addition, because the data on a hard disk is so easily accessible, computer viruses, software failures, and operation errors can easily damage stored data. For this reason, important data is often copied onto removable media which is removed from the system so that no failure of the system can directly damage the data. This process is referred to as backing-up the data. If there is a failure in the computer system, the data on the system storage device can then be restored by copying the backed-up data from the removable media.

Also, in order to increase reliability of hard disk storage, computer systems used for critical, changing information commonly use a system known as a redundant array of inexpensive disks (RAID). In a RAID system, instead of being stored on a single hard disk, each data file is about evenly spread out across several data disks by a RAID controller card. In addition, parity information is written to a parity disk, so that if any single disk drive fails, there will be no loss of data or access to the data. Access to the disks is cycled across the data disks by the RAID disk controller and parts of each disk file is read or written in turn to each data drive. This allows a large number of smaller inexpensive disks to operate as though they were one large disk drive. This process of spreading the data across multiple devices is known as striping. Typically in a RAID system, the disk drives are networked to a disk controller card using a small computer interface (SCSI) peripherals network. Commonly available SCSI type RAID disk controllers access up to 13 data disk drives and one parity disk drive and inexpensive SCSI disk drives holding 23 GB (gigabytes=1 billion bytes) are available thus providing up to 299 GB of highly reliable storage in one hard disk storage system (HDSS).

The cost of high speed, random access, storage devices is one of the major costs of computer systems. Because the cost of sequential access storage (including the removable media) is much lower per unit of storage than the cost of high access speed storage, it is common to move data (programs files and data files) which are not immediately needed onto removable media in sequential digital storage devices. The removable media is then removed from the drive and replaced with other media. This process of temporarily moving files from random access storage devices onto media in sequential devices, and then removing the media from the system, is known as archiving. When the data are again required, then the media is loaded into the sequential device, and the files are copied back onto the high access speed storage devices in a process known as restoring the data.

Digital tape units are especially popular for backing-up and for archiving digital data because of the extremely low cost of tape. High quality tape units which write digital data at 3 million bytes per second (10 MBs) are commonly available.

The invention also relates to computer networks. In order to reduce the cost of data processing systems, several computers can be linked using communications cables. This allows the computers to use some parts of other computers and some or all of the data stored on other computers. Such interconnected computers are referred to as computer networks. The individual computers are usually referred to as nodes of the network, and the communication paths (e.g. cables) and communication equipment are referred to as a communication network. The telephone system is an example of a communications network to which computer nodes may be connected, using MODEMs or ISDN devices, to form a computer network. Other common communication networks include Ethernet, ARCnet, and token ring networks. In a computer network, files, storage space, printers and other resources of nodes referred to as servers, can be used by other computer nodes referred to as clients.

The invention is especially useful in the cable television industry. Cable television distribution has traditionally utilized semi-automated controls. Most cable distributors receive channels from program producers through satellite downlinks, video tapes, and dedicated lines. At the cable distributor, tapes are loaded into a VCR player, which is then manually queued and started to provide a program signal. Signals from the various program sources are routed from source cables by manually controlled switchers through modulators to provide each program at a different frequency channel, and the modulated signals combined into a distribution cable. This equipment used to provide the signals into the cable television distribution system, is commonly known as the head-end. For each channel with local commercials, a cartridge for each local commercial is loaded into a cartridge tape machine, which has been automatically queued and programmed to automatically play the correct local commercials on the correct channel at a particular time. The cable distributor may simultaneously distribute over 100 channels through a cable system.

Many cable operators are preparing to introduce multi-casting into their cable systems. In multi-casting, different programs and commercials are broadcast to different parts of the cable system or to different types of viewers (i.e. viewing customers). For example, different neighborhoods may receive programs specific to their demographics and receive commercials specific to their local businesses. Preferably, the same show could be broadcast at overlapping times depending on the commercials scheduled in the different portions of the cable system. Multi-casting requires a more automated approach since a different set of operations is required for each local area, so that many more simultaneous operations are needed.

Video servers, also known as multimedia servers, are a solution to the complexity of operating a multi-casting system. A video server can easily play the same or different local commercials on several different local portions of the cable system at simultaneous or overlapping times. For example, local commercials may be loaded from tape into the disk storage of the video server, and the video server can be programmed to automatically play the correct commercial in the correct channel for each local area. Different programs can also be loaded into the video server to automatically play in different local areas at different times.

For example, Philips produces Media Pool video servers which allow a large number of video production peripheral devices to simultaneously access a large number multimedia productions. Typical video peripherals include film scanners, frame editors, digital tape archival systems, video cameras, VCR units, program distribution links, and cable distribution systems (head-ends).

Instead of being stored on a single PAID hard disk system, each data file is about evenly spread out across multiple RAID systems called hard disk storage systems (HDSSs). To give each video peripheral device access to all the data in all the HDSSs, each device is connected to one or more input-output (I/O) ports. A computer controlled switching unit called the commutator then cycles the connections between the I/O ports and the HDSSs, so that each HDSS is regularly switched from I/O port to I/O port and the I/O ports are similarly switched from HDSS to HDSS. As the I/O port for a given device is cycled by the commutator across the storage systems, parts of the file are read or written in turn on each storage system. This allows a large number of peripheral devices to simultaneously have access to the same file without conflicts. This process of distributing files across all the HDSSs is referred to as striping. With HDSS striping, a tape drive can back-up a video file while the same part or another part of the same file is being used by a frame editor and also the same or other parts of the file are being broadcast to different portions of a multi-casting cable system, for example.

For each production (program or commercial), several files of multimedia data must be stored in the HDSSs of the video server. Typically, a single production requires a video file and up to four audio files. Furthermore, there may be several auxiliary files specifying additional information, including arrangement information and time code information describing how to arrange the information from the video and audio files to form a multimedia stream and when to broadcast portions of the information to play the stream.

In order to play the multimedia production, the time code, arrangement, video, and audio data must first be read from respective files stored in the HDSSs. The video and audio data is then broadcast in a predetermined order at predetermined times according to the arrangement and time code information to play the multimedia data stream.

Successful operation of current multimedia servers requires careful planning. The loading or restoration of any required multimedia productions must be completed before the scheduled broadcast time. Furthermore, there must be sufficient hard disk storage space for restoring the required productions so that other productions may have to be archived. Finally, restoration often requires other computer resources (e.g. I/O ports, tape drives, bandwidth through the commutator) which might not be available at all times.

Many cable systems offer a service known as pay-per-view in which subscribers who wish to see a special production can call a provider to order access to the production, often up to just a few minutes before the production starts. Typically, a small group of productions are repeated sequentially on a channel so that viewers who wish, may view the production at different times.

Many cable providers desire to offer an improved pay-per-view service known as near-video-on-demand, in which the same production is broadcast on multiple channels starting at staggered times, so that a viewer who desires to see a production and misses the start of the production will not have to wait through the entire length of the production before seeing the next available starting of the broadcast. In order to provide near-video-on-demand directly from tape, a multitude of copies of each production and a separate player for each channel will be required. Thus, it is economical to load such productions onto a video server which can simultaneously play different portions of the same copy of the production onto different channels.

Many cable systems are also preparing to offer a service known as video-on-demand in which a subscriber requests a particular multimedia production from hundreds or even thousands of available productions, and then the provider broadcasts the production to that viewer through the cable as quickly as it can be made available. Preferably, in addition to play, the service should provide for viewer commands for so called trick play functions such as pause, frame-by-frame forward and reverse, slow motion forward and reverse, play in fast forward and reverse, very fast forward (wind) and reverse (rewind, and other multimedia manipulations currently provided by advanced VCR machines. Furthermore, the random access storage of a video server would allow providing random access viewer commands such as go to a scene or jump forward or backward a given playing time, and similar functions provided on advanced CD changers. It would be prohibitively expensive to operate such a system using a separate player and separate taped copy of a production for each potential simultaneous viewer in such a system.

Multimedia productions require large amounts of digital storage. One hour of programming of regular definition television, in motion JPEG format for instance, may require as much as 6 GB of storage, and video-on-demand customers may demand to select from thousands of hours of programming. Thus, it is not practical to store all of the desired productions in random access storage. Thus, in a video server, most productions must be kept in archival storage, so that viewers who request an archived production must wait while the production is restored from archival storage.

Those skilled in the art are directed to U.S. Pat. No. 5,539,660 to Bird et al. describing a multimedia server with a cartridge tape unit. U.S. patent application Ser. No. 08/641,153 entitled "Advanced Data Server and Server System" describes another multimedia server. U.S. Pat. No. 5,305,438 describes a video storage system with an archival tape unit, and U.S. Pat. No. 4,949,187 describes a video server with an archival tape system. These above citations are hereby incorporated in whole by reference.

SUMMARY OF THE INVENTION

It is an object of the invention to provide a multimedia data server requiring less critical planning for providing digital multimedia productions.

It is another object to provide a multimedia data server in which a digital multimedia production can begin playing essentially immediately upon selection at the same time that the production is being restored.

It is another object to provide a multimedia data server which is more convenient to operate.

It is another object to provide a multimedia data server in which a production is available for viewing while being restored from an archival copy.

In the invention disclosed herein, digital video, audio, and auxiliary files for a multimedia production are archived in an interleaved fashion, in approximately the same temporal order on an archival sequential access storage system (e.g. a tape drive) as that required for playing a multimedia data stream. During archiving, the system must first read the blocks of audio, video, and time code data from random access storage (e.g. a hard disk). The system then interprets the time code data so as to write the audio and video data to the tape storage in approximately sequential temporal order. Preferably, the information is stored with additional information about the disk formatting and stored in a format so that the data can be easily transferred from a tape file to hard disk files, and then played from the hard disk storage almost immediately (as soon as enough data has been restored to read the files and to generate the beginning of a multimedia data stream).

In one embodiment, during restoration, the system first reads the blocks of the interleaved files in sequential format from the tape storage into a buffer. Then the system copies the data, reformatted to fixed size blocks, into a second buffer, and finally writes the fixed size blocks to hard disk storage. Preferably the data is restored at as high a rate as possible given the bandwidth restrictions of the tape drive and disk drive storage systems. At the same time, the system allows access to any files in random access storage necessary to begin playing the multimedia production.

In another embodiment of the system, during restoration, blocks of data from the tape are copied into a buffer, and the data is formatted for a video stream. This formatted data is then stored in a second buffer from which a multimedia data stream can be played in real time. Preferably, the system also allows a higher speed restoration for fast-forwarding. At the same time, the data in the data stream, first buffer, or second buffer is converted into fixed size, formatted blocks for restoring to hard drive storage. This disk formatted data is then copied into an intermediate buffer from which the blocks are written to the hard drive system, thus, restoring the production. This allows the same I/O unit to simultaneously restore and play a production, and reduces the I/O traffic for the commutator and RASSs. Again, the system allows the files for the multimedia production in hard disk storage to be accessed and played, for example, by another video-on-demand viewer, as soon as sufficient portions of all the files of the production are restored onto the hard drives.

Both of these embodiments allow a viewer to access a production, archived as digital files (not as a multimedia data stream), almost immediately. Furthermore, they also allow other viewers to access the same production while it is being restored, without requiring multiple tape copies of an archived production. Finally, the system allows a production to be played during archiving by the same input and/or output unit used for the archiving. Again this reduces the number of I/O units and I/O load through the commutator and into the random access storage.

Those skilled in the art can understand the invention and additional objects and advantages of the invention by studying the description of preferred embodiments below with reference to the following drawings which illustrate the features of the appended claims:

DETAILED DESCRIPTION OF THE PREFERRED EMBODIMENTS

Figure 1:
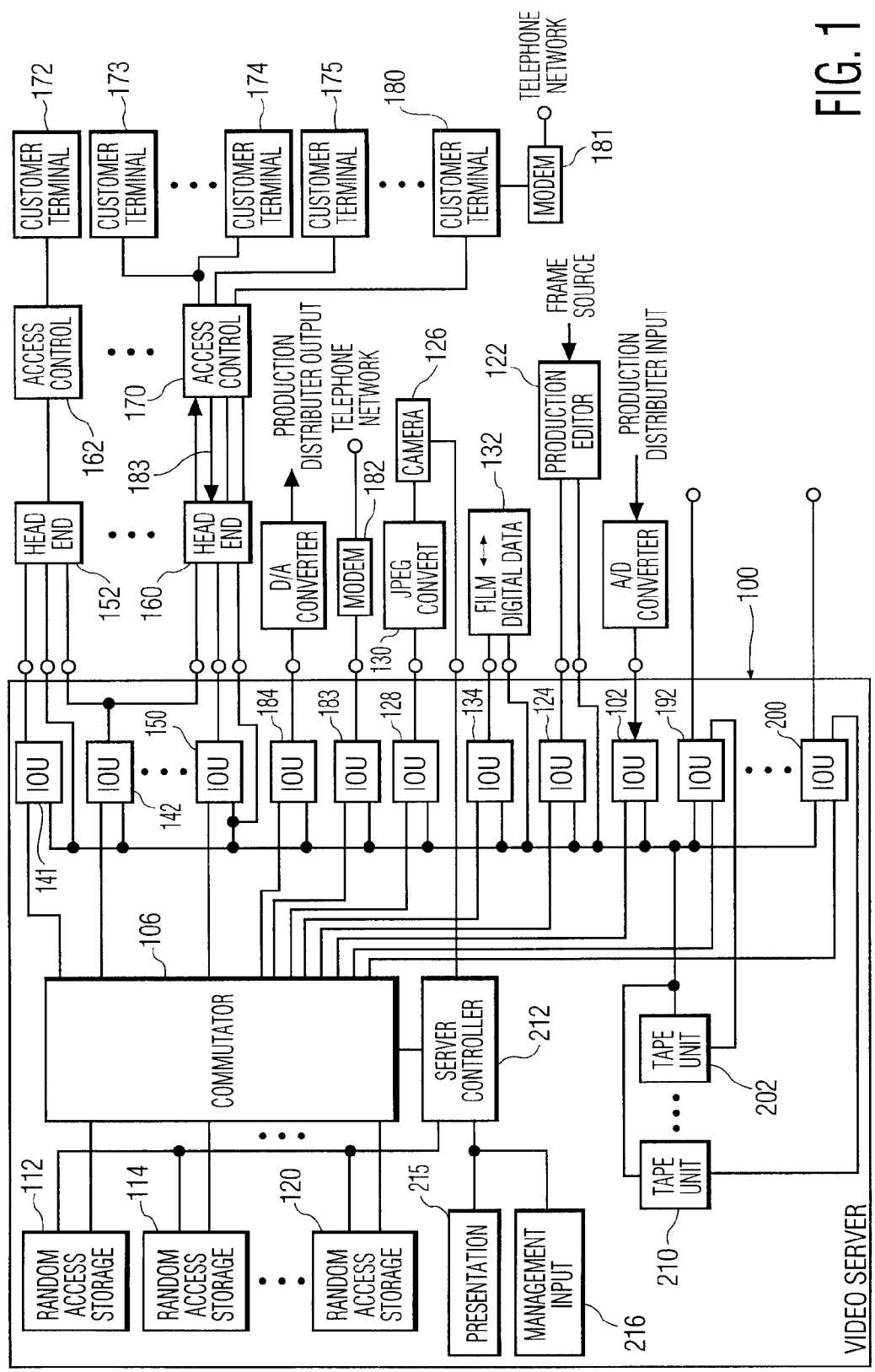
FIG. 1 shows a specific embodiment of the system of the invention for archiving the files of a multimedia production from hard drives to tape storage, interleaved approximately in temporal order, and for immediately playing the production as the files are restored.

In the drawings, the same labels may be used in different drawings for similar methods or apparatus or different labels may be used. Also, communication links that do not have arrows may be bi-directional.

FIG. 1 shows a specific example embodiment of a system of the invention, including a portion of video server 100 of the invention for archiving files of multimedia productions interleaved in about temporal order. The system receives multimedia data streams for productions from providers through input and/or output unit (IOU) 102. If required, analog to digital converter 104 is provided to convert the data stream from analog to digital form. As described below, the digital multimedia data stream is converted into fixed size blocks of data suitable for random access storage in video, audio, and auxiliary files. The blocks are distributed by commutator 106 across multiple random access storage systems (RASSs) 112–120. JPEG video frames and possibly audio channels, may also be input or modified using production editor 122, and routed through IOU 124. The system also receives input from digital camera 126 through IOU 128 after conversion to a motion JPEG video stream in JPEG converter 130, if required. Finally, the system receives input of a motion JPEG video stream through film-to-digital-data converter 132 through IOU 134.

Commutator 106 may be any type of network of connections between two groups of terminals which allows for a cycling of connected terminals. That is, each terminal of the first group connects in turn with each of the terminals in the second group. Preferably the commutator is an M by N switching network, controlled by a service controller discussed below. Only one video server is shown with one commutator, but a server may include multiple commutators connected, for example, through a video switcher to the I/O units. Alternately, multiple video servers may be provided for one cable system with, for example, connections between several video servers and each head end.

Preferably, each RASS includes a SCSI disk controller and up to 14 random access storage devices such as hard disk drives or optical disk drives, but other types of storage systems could be used. Herein, the term "disk" generally refers to any type of random access storage unit because disks are the predominate type of such random access storage units. Only a few RASSs are shown, but a typical video server should have a large number of such storage systems, limited only by the number of connections provided through the commutator. In a simple embodiment all the files of the system are striped across all the RASS's and the number of I/O units that can be connected equals the number of RASSs in a simple periodically-cycling, circular-shifting, round-robin connection scheme so that each IOU in turn accesses each RASS once in every cycle and every IOU is connected to a different RASS and every RASS is connected to a different IOU and thus, every IOU can potentially access all the portions of all the files during every connection cycle. Alternately, more complex storage and access scheduling can be provided to, for example, allow more IOUs than RASSs and different access periods for different IOUs depending on the I/O bandwidth requirements and criticality of the IOUs. Redundancy may be provided for the RASSs, but for video systems redundancy is not generally required since disk controllers are typically, highly reliable.

The multimedia data stream may be an analog NTSC or PAL video signal, a digital MPEG2 stream of packets, or a motion JPEG data stream. The provider may supply the production through a satellite downlink (not shown), through a dedicated line (not shown), or by providing media (not shown) that are played on a VCR or other device (not shown). For clarity, only one IOU for receiving input from providers is shown, but a typical cable distributor may simultaneously receive input from over 100 channels. Preferably, the video files are stored in JPEG format to allow editing in production editor 122. Alternately, the video files may be stored in MPEG frame groups, for example, groups of 9 frames padded to make each group equal size. The blocks of data for each of the files are striped across the RASSs. Preferably, at least one of the storage units provides redundant data to speed up access and/or prevent data loss.

Productions are played for cable service viewers by reading fixed size disk blocks for multiple files from a multitude of the RASSs 112–120 for each file, routing the data through commutator 106, converting the fixed size data blocks to a multimedia data stream in IOUs 142–150 and transmitting the data streams from the video server to one or more head-ends 152–160. The data streams are then routed to access control units 162–170 near one or more of the viewers, and then to multimedia terminals 172–180 for the viewing customers.

A separate head-end is provided for each independent area or for other grouping of subscribers of the cable distribution network, and each head end may have over 100 channel inputs. Even though many or even all of the channel inputs to the head-ends may be from the video server, only a few such inputs are shown for clarity. Typically, the data stream is routed from each head end to thousands or hundreds of thousands of local access control units, even though only one access control unit is shown for clarity. Ten to one hundred viewers are usually serviced by each access control unit, but only one or a few are shown for clarity. Multiple viewer terminals 173, 174 may be connected to each output of an access control unit, and some households with multiple viewer terminals may use multiple outputs of the access control unit. The viewer terminals allow display of the multimedia productions.

In addition, the viewer terminals may provide for inputting access requests, inputting control commands, telephone connection, Internet connection, or even transmitting multimedia data back the video server. The terminal may include apparatus for requesting access to multimedia productions and controls for video-on-demand functions discussed above. The viewer terminal may include a camera and microphone (not shown) for video conferencing or for authoring multimedia productions. The viewer may be able to edit frames using the terminal, and to upload productions from a frame editor or VCR into private or shared storage in the video server for later viewing. A path may be provided from viewer terminals back to the video server by the telephone system, the cable system or by some combination. For example, data may be transmitted through MODEM 181 to a telephone connection, then from the telephone connection through MODEM 182 and IOU 183 to the video server for access requests, control commands, Internet page requests. Alternatively, transmission may occur through an available channel to the access control units, then through a separate return cable 183 for terminal input back to the head end, and then from the head end to an IOU.

Multimedia productions may be provided to another production distributor such as another cable distributor, news network or program provider through IOU 184 and digital to analog (D/A) converter 185, if required. Not shown are satellite up-link, dedicated cable, or VCR recorder to transmit the signal to the other distributor.

Data which is not immediately required may be archived from RASSs 112–120, through commutator 106, through IOUs 192–200, to recording/reproducing units 202–210 for recording on removable media. The IOUs may have other connections for input or output, as previously described in relation to the other IOUs.

Figure 2:
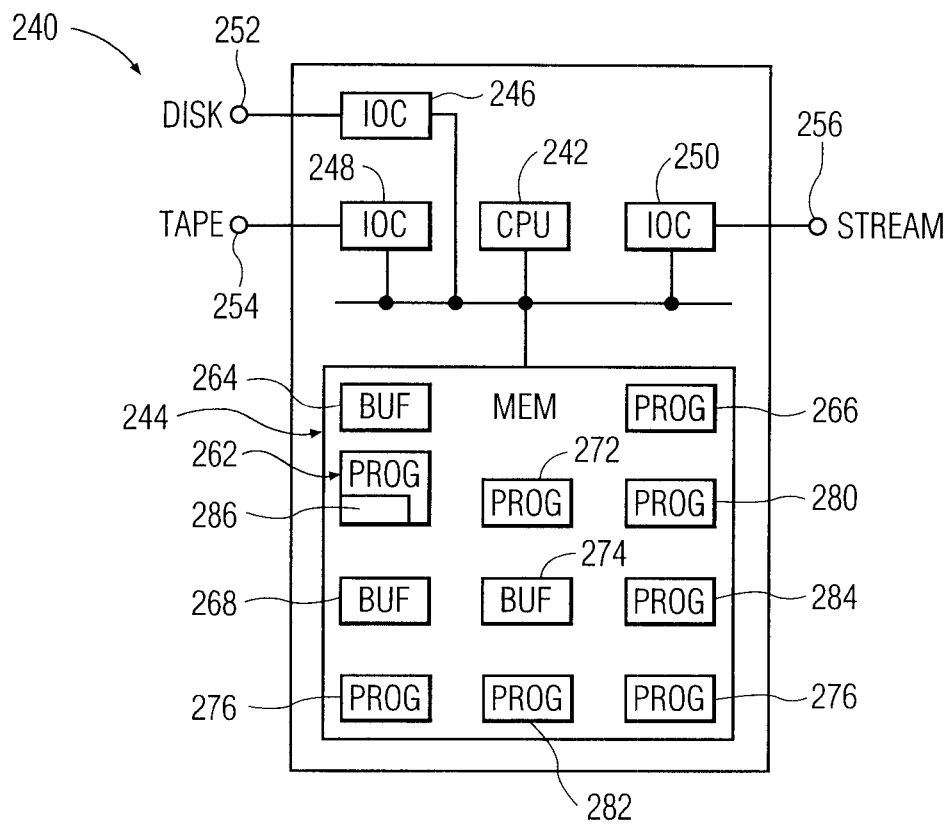
FIG. 2 illustrates a multimedia input and/or output unit for archiving and restoring the files of a multimedia production in a specific embodiment of the invention.

FIG. 2 shows an embodiment of the IOU 240 of the invention with a micro-controller 242 connected through a bus with memory 244 and input and/or output circuits (IOCs) 246, 248 and 250. The IOU is connectable at terminal 252 to the commutator through IOC 246, connectable at terminal 254 to a tape unit through IOC 248, and connectable to terminal 256 for I/O of a multimedia data stream through IOC 250. Preferably IOC 246 includes SCSI controller apparatus to operate one or more SCSI tape units, and the tape controller portion may be external or a part of the internal circuit as shown.

In an archiving process, program module 262 controls the CPU 242 and IOC 246 to request and receive fixed size file blocks formatted for random access storage from files striped across RASSs 112–120, and to store such file blocks into contiguous buffer 264 of memory 244. Program module 262 directs IOC 246 to request blocks of auxiliary, audio, and video data from disk files, as required to supply the data from buffer 264. Program module 266 controls the CPU to reformat or convert the blocks formatted for random access storage in buffer 264 into blocks formatted for sequential access storage, stored in buffer 268. In the conversion, the blocks for random access storage are copied into blocks of a different, preferably larger, fixed size for sequential access storage e.g. onto digital tape. Typically, tape blocks are several times larger than disk file blocks. Blocks from the video, audio and auxiliary files are all packed into the tape blocks and saved to tape in approximately the sequential temporal order that the information is required to play the production. The information is stored so that the data can be easily unpacked from the tape blocks back into blocks for the hard drive. Then the data in buffer 264 that has already been converted is deleted to provide space for additional blocks from random access storage files. Program module 270 controls the CPU and IOC 248 to transfer the blocks from buffer 268 to one of the digital tape recorders 202–210 (shown in FIG. 1).

In one embodiment of the invention, at the same time that data is being archived from random access storage to sequential access storage, the data may also be played using the same IOU. Program module 272 controls the CPU to convert the data in buffer 264 from blocks formatted for random access into data for a multimedia data stream, and the data is stored into buffer 274. Then program module 276 controls the CPU and IOC 250 so as to play a multimedia data stream from buffer 274 through IOC 250. Preferably, at least parts of modules 272 and 276 are used for providing a multimedia data stream from IOC 250 when no archiving is occurring as in IOUs 141–150 and 184 in FIG. 1.

In a restoring process, program module 280 controls the CPU and IOC 248 to request and receive blocks formatted for sequential access from one of the digital tape units 202–210, through IOC 248 and into buffer 268 for storage. Then program module 282 controls the CPU to convert the data from the sequential access blocks in buffer 268 into fixed size blocks for random access storage and to store the blocks into buffer 264. Program module 284 controls the transfer of the blocks of data from buffer 264, through IOC 246, through the commutator 106, (see FIG. 1) and to stripe the data across the disk storage systems 112–120.

In another specific embodiment of the invention, at the same time that archived data is being restored from the tape drives to the hard drives, the same IOU can also play the multimedia production. Program 272 controls the CPU to convert the data in buffer 264 from blocks formatted for random access into data for a multimedia data stream, and to store the data into buffer 274. Then program module 276 controls the CPU and IOC 250 so as to play a multimedia data stream from buffer 274 through IOC 250.

Preferably, IOU 240 is able to play a multimedia production when another IOU is restoring archived data from one of the tape units to random access storage. Program module 262 controls the CPU 242 and IOC 246 to request and receive fixed size file blocks formatted for random access storage from files striped across a plurality of RASSs 112–120 and to store such file blocks into contiguous buffer 264. Program module 262 includes section 286 for requesting file blocks as soon as sufficient blocks have been stored into files, striped across the random access storage system, to begin forming a multimedia data stream i.e. while data is being written to the files, data is read from earlier portions of the files. Program module 262 directs IOC 246 to request blocks of time code data, audio data, and video data from disk storage, as required to supply data from buffer 264. Then as described above, program 272 controls the CPU to convert the data in buffer 264 from blocks formatted for random access into data for a multimedia data stream, and to store the data into buffer 274. Program module 276 controls the CPU and IOC 250 so as to play the multimedia data stream from buffer 274 through IOC 250.

Figure 3:
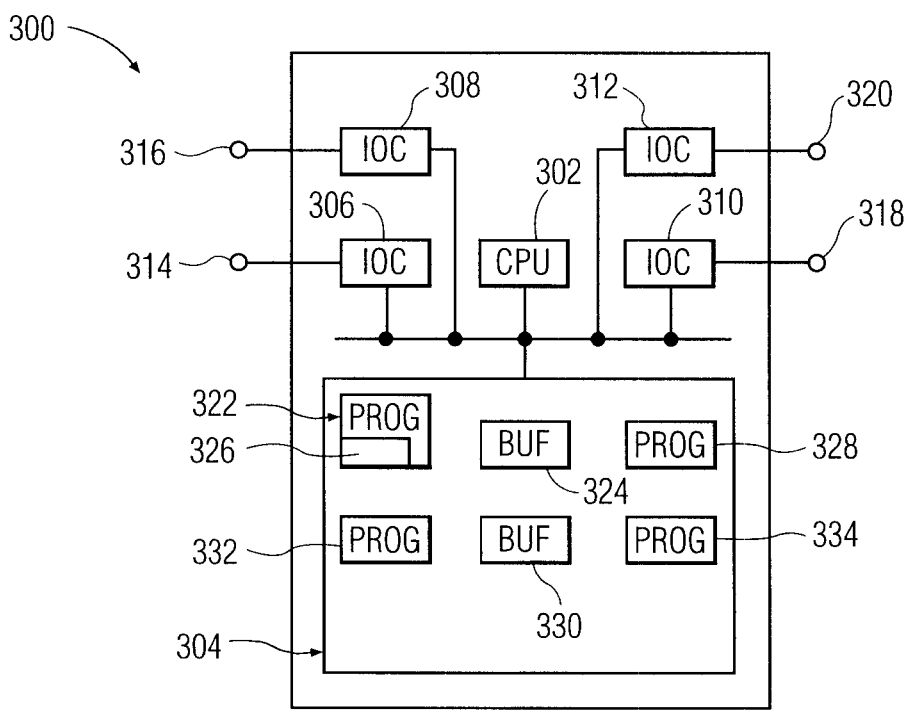
FIG. 3 portrays another multimedia input and/or output unit for playing the production as it is being restored by another input and/or output unit.

FIG. 3 shows another embodiment 300 of an IOU for playing a multimedia production while another IOU is restoring the production from an archival tape system. IOU 300 includes embedded micro controller 302 connected through a bus with memory 304 and I/O processors 306, 308, 310 and 312. IOC 306 is connectable to commutator 106 through input terminal 314, and IOC 308 is connectable to service controller 212 (of FIG. 1) through control terminal 316. IOC 310 is connectable to a destination for a multimedia data stream through output terminal 318, and IOC 312 is connectable to the multimedia destination to receive controls such as production requests, play, play in reverse, fast forward, rewind, pause, goto scene or time.

Program module 322 controls IOC 306 and the CPU so as to transmit requests for blocks of data, to the service controller 212 (see FIG. 1). The service controller schedules access through commutator 106 (see FIG. 1) and commands the storage systems to provide blocks of data through the commutator and input terminal 316 to the IOU. Program module 322 then stores such blocks of data into buffer 324. Program module 322 includes apparatus 326 for accessing files which are in the process of being restored by another IOU. Typically, the request is for specific blocks from multiple files in the RASSs including video, audio and auxiliary files. Program 328 controls the CPU to convert the blocks formatted for random access storage into data for providing a multimedia data stream stored into buffer 330. Program 332 controls the CPU and IOC 310 to receive service commands discussed above, from the destination viewer (not shown) through terminal 318 and IOC 310. Program module 332 communicates with other program modules such as program module 322, to provide the requested services. Program module 334 controls the CPU and IOC 312 to provide the multimedia data stream from buffer 330, through IOC 312 and terminal 320 to the destination viewer.

Figure 4:
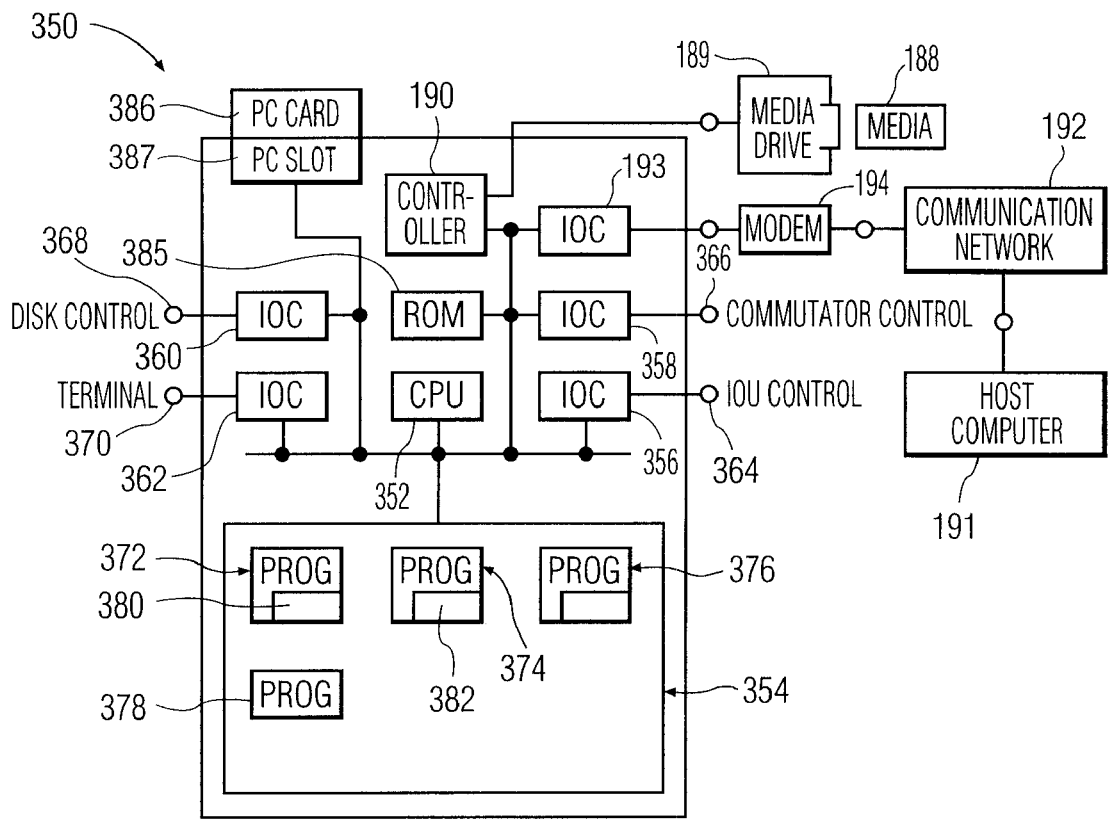
FIG. 4 shows details of a specific embodiment of the service controller of the invention for reading earlier portions of the files of a production as later portions are being written.

FIG. 4 illustrates some of the details of a specific embodiment of service controller such as controller 212 of FIG. 1. Preferably, the service controller is a general purpose, high performance work station with a multitasking operating system to continuously control the connections through the commutator and to service requests for file blocks from the IOUs. The operating system of the work station allows access to the CPU to be shared by several program modules taking turns one-at-a-time for a fraction of a second during each turn, so that operation of the programs appears to be simultaneous. The controller includes a central processing unit (CPU) 352 connected to electronic memory 354 and IOCs 356, 358, 360 and 362 connected with respective terminals 364, 366, 368 and 370. Program module 372 controls the CPU and IOC 356 to receive and transmit control signals to the IOUs. For example, the service controller may receive a request from one of the IOUs to read the files for a multimedia production. The files are each striped across a plurality of RASSs. Program module 372 conveys the request to program module 374 which schedules access through the commutator to read the files striped across the RASSs repeatedly sequentially in turn. Program module 374 controls the CPU and IOC 358 to communicate with the commutator. Program module 374 changes the state of the interconnection switches through the commutator in cycles so that during each cycle, each IOU has access to each random access storage system, across which files are striped, that the IOU needs access to.

Program 376 controls the CPU and IOC 360 to transmit control signals to control the I/O of the RASSs so that blocks of data are stored or retrieved at precisely the correct time in coordination with the settings of the access switches in the commutator and resulting connections with the IOUs. Program 378 provides a user interface for imputing management commands and displaying messages and reports from the service controller to verify receipt of the commands and describe the status of the system.

A portion 380 of program 372 accepts requests to read blocks of files for a multimedia productions which is being restored from archival storage. Preferably, portion 380 allows multiple files to be simultaneously written by one IOU and read by another IOU. Portion 380 keeps track of which parts of the files for a production have been written, allows access to the parts for which writing is complete, and denies access to the parts for which writing is not complete, and reports status back to the IOU. Program 374 has portion 382 which schedules access through the commutator for reading blocks of files when access by another IOU has also been scheduled for writing blocks of the files. Program module 376 has a portion which controls the operation of the RASSs so that blocks can be read from files for a production alternately with writing blocks to the files.

The service controller is programmable to provide the programmed apparatus (program modules, data structures and data) of the invention. The controller can be programmed by introducing signals and writing the signals to ROM 385 or the fast RAM 354. The signals may be introduced to the controller through one of the IOUs or from one of the RASSs or by replacing the ROM in a socket of a circuit board (not shown) of the controller, or by inserting a ROM cartridge 386 such as a PC card into a PC card slot 387 of the controller. The programming signals can be introduced to the service controller by inserting replaceable media 188 such as a disk or tape into media drive 189 connected to controller 190. Alternately, the media drive may contain non-removable media and the drive is conveniently connectable/disconnectable from the controller. The media and drive cooperate to generate the programming signals. The signals can be introduced from another computer system 191 through a communication network 192 connected to IOC 193. For example, an internet server can be connected through the telephone system using MODEM 194. In a similar manor the IOUs and/or RASSs may also be programmable in order to implement the invention.

Figure 5:
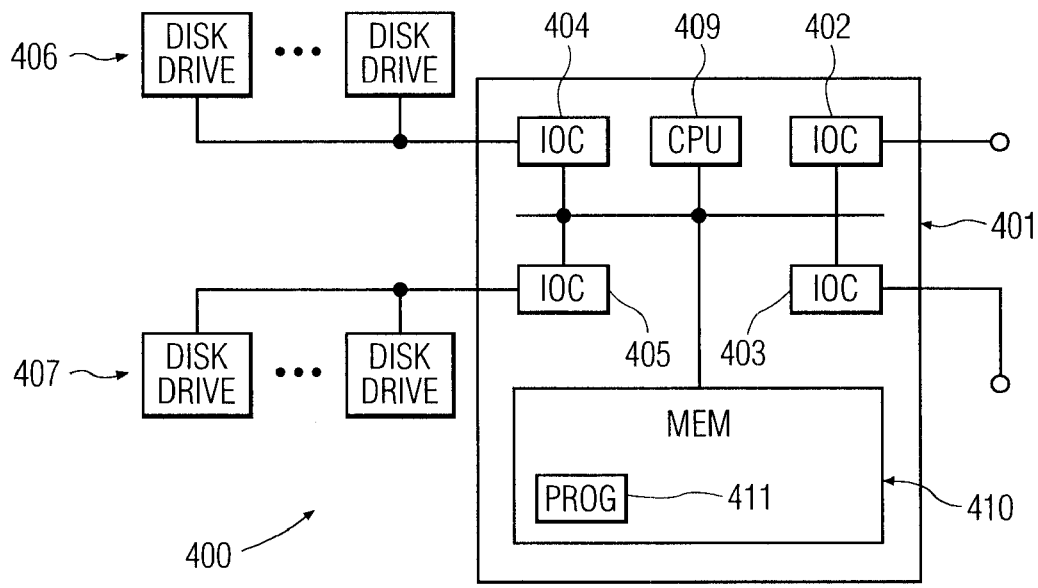
FIG. 5 is a block diagram illustrating an embodiment of a random access storage system of the invention for reading earlier portions of the files of a production as later portions are being written.

FIG. 5 illustrates an embodiment 400 of a random access storage system (RASS) of the invention. A system controller 401 may be connected through IOC 402 to communicate with the commutator 106 (see FIG. 1) and through IOC 403 to communicate with server controller 212 (see FIG. 1). The controller communicates through IOCs 404 and 405 with one or more groups of disk drives 406 and 407 respectively. Preferably, files are striped across a plurality of the disk drives with information blocks sequentially written to each drive of a parity group, and parity data written to a parity drive of the group so that if one of the drives of the group fails, the data is not lost, and system performance is not significantly degraded. Each drive such as disk drive 408 may be a magnetic hard disk, or a rewritable optical disk drive such as a DVD drive. An embedded controller (CPU) 409 is operated by programs in memory 410 which also contains buffers for holding data during I/O. Program module 411 controls the CPU to allow blocks of files to be read from the system as soon as a portion of blocks have been written to a file in the system.

Figure 6:
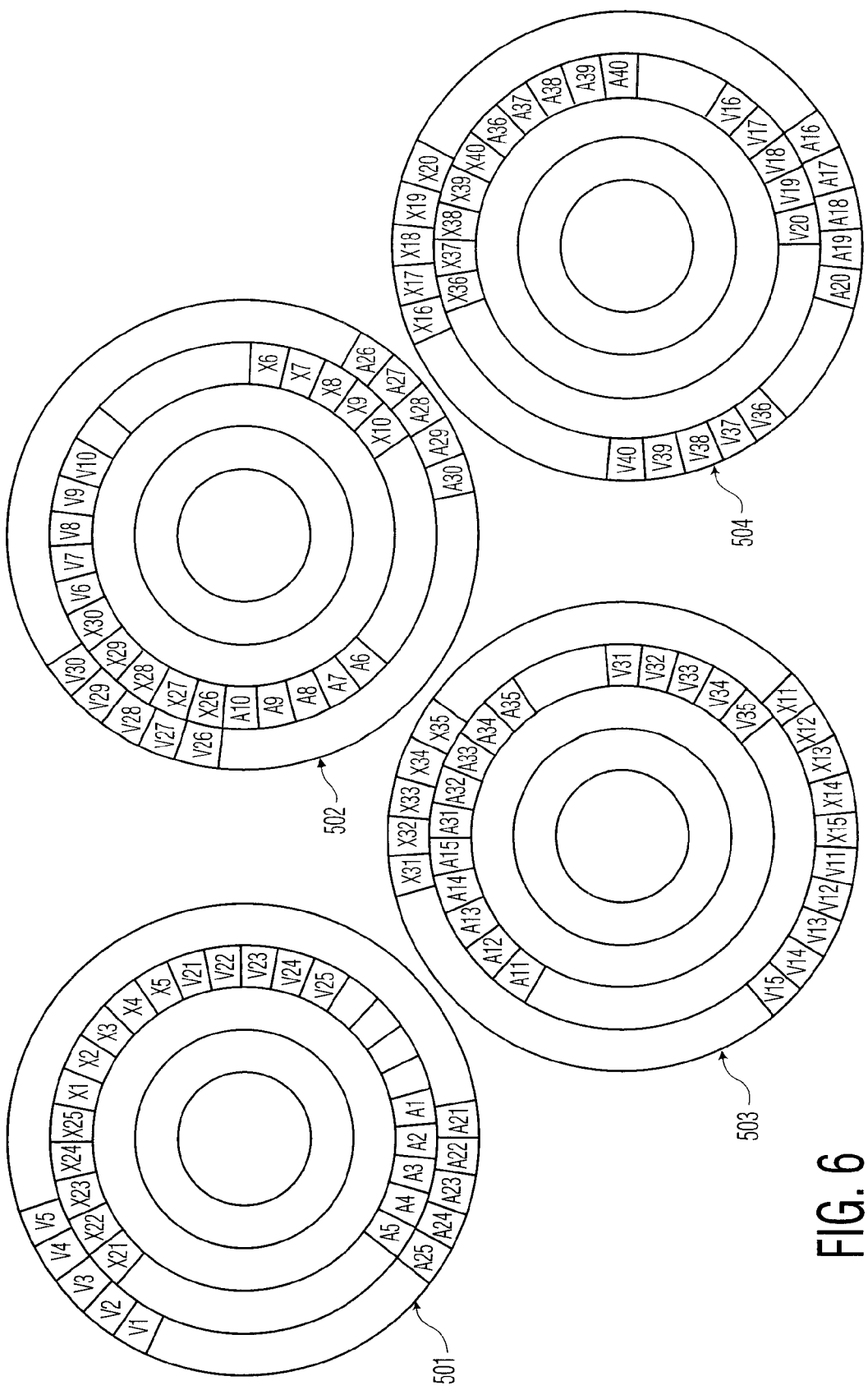
FIG. 6 schematically shows a format for the files on a hard disks of the system of the invention before archiving.

FIG. 6 will be used to schematically illustrate the files of a multimedia production striped across multiple RASSs. Each RASS is represented respectively by one of the disks 501, 502, 503 and 504. This system is shown with only four RASSs even though there will typically be, a large number of RASSs. Only one disk is used to represent each RASS even though each RASS typically has up to 14 hard drives, and each hard drive typically has 5 to 10 disks. The disks are shown with four tracks each holding only about 36 blocks each, but hard drive disks typically have thousands of tracks each holding thousands of blocks of data. Typically, each IOU is connected to each RASS one-at-a-time in turn through the commutator. Of course if there are more IOUs than RASSs, then during each connection cycle each IOU will take some turns being idle. For example, if the bandwidth from the RASSs through the commutator is 40 MBs, but the IOUs only need 4 MBs then a commutator allowing 10 times as many IOUs as RASSs is possible.

The number of information blocks accessed during each connection between switching of the commutator, depends on the connection time between switching and on the data rate.

In this example, an IOU will access five blocks of an RASS during each connection. When a multimedia data stream is received into an IOU, the stream is converted into blocks that are formatted for storage into files on the RASSs. The blocks from the IOU are transmitted through commutator 106 and striped across files on the RASSs. Most of the data will be stored in a video file, some of the data will be stored in audio files, and some of the data will be stored into one or more auxiliary files.

As an example, the first portion of a video file is written from a first IOU. The first IOU is connected to RASS 501 and five blocks V1–V5 are written to the RASS. At the same time a second IOU is connected to RASS 502, a third IOU is connected to RASS 503, and a fourth IOU is connected to RASS 504. Then the first IOU is connected to RASS 502 and another five blocks V6–V10 are written. Again at the same time the second IOU is connected to RASS 503, the third IOU is connected to RASS 504, and the fourth IOU is connected to RASS 501. Then the first IOU is connected to RASS 503 and anther five blocks V11–V15 are written, and then the first IOU is connected to RASS 504 and another five blocks V16–V20 of the video file is written.

Then, for example, a portion of the audio file for the production is written. The first IOU is reconnected to RASS 501 and five blocks A1–A5 of the audio file is written; then the first IOU is reconnected to RASS 502 and the next five blocks A5–A10 of the audio file is written; then the first IOU is reconnected to RASS 503 and the next five blocks A11–A15 of the audio file is written; and finally the first IOU is reconnected to RASS 504 and the next five blocks A16–A20 are written.

Then in a similar way, the first portion of the auxiliary file for the production is written striped across all the RASSs. The first five blocks X1–X5 are written to RASS 501; then the next five blocks X6–X10 are written to RASS 502; then the next five blocks X11–X15 are written to RASS 503; and finally, the next five blocks X16–X20 are written to RASS 504.

Sequential portions of the files for the production continue to be striped across the RASSs until the production is fully loaded into the RASSs.

Figure 7:
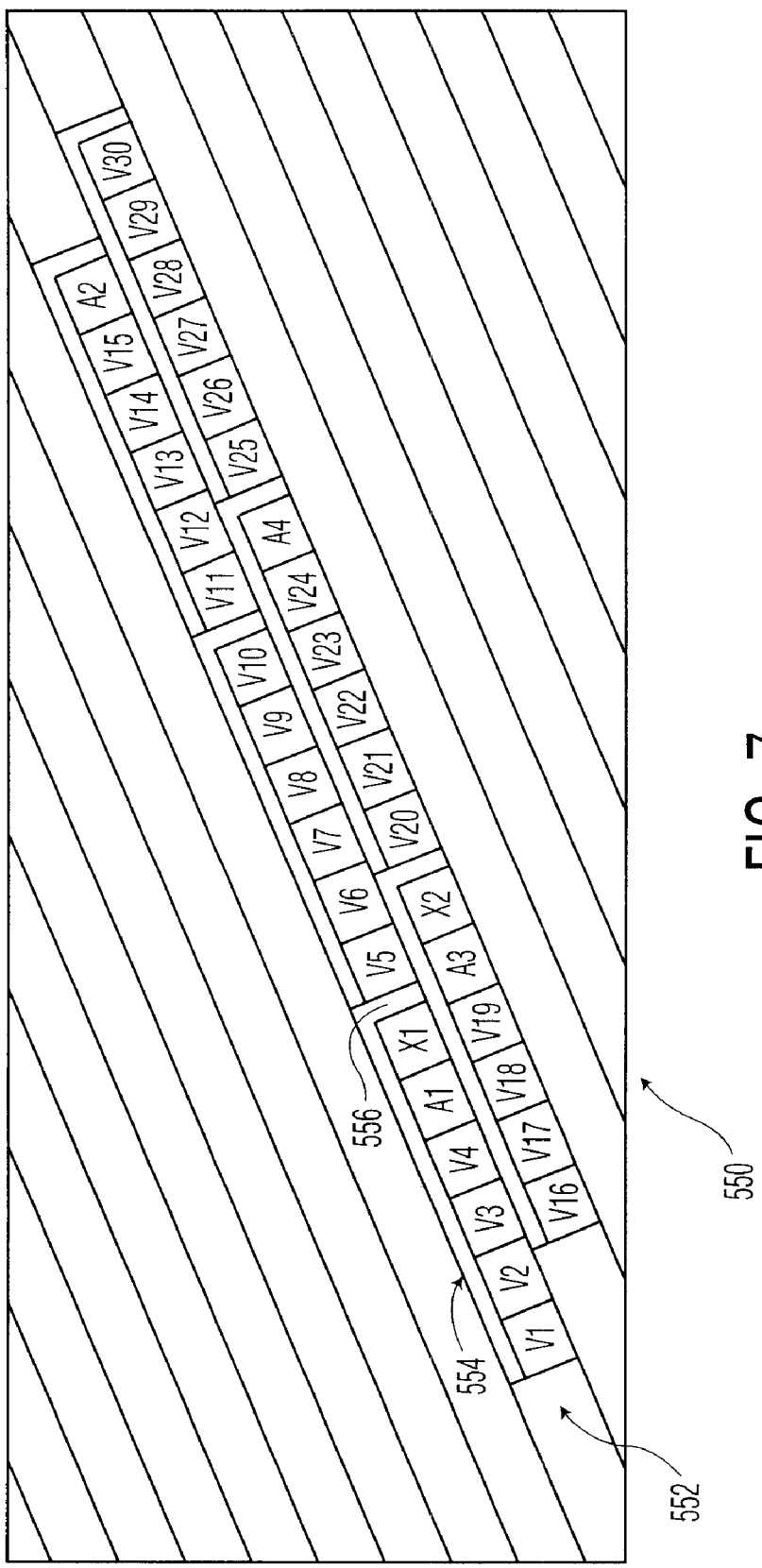
FIG. 7 schematically shows a format for the files interleaved on the archival tape of the invention.

FIG. 7 illustrates the files for a multimedia production that is archived interleaved in the tracks of a digital tape 550. Tracks can be written on the tape in many different ways, but is shown here for example, with slanted tracks produced by a rotating head similar to those produced by a VCR. Typically, the angle between the longitudinal direction of the tape and the track will be about 6°, but is shown herein at a much higher angle to allow the contents of several tracks to be shown on this short segment. Typically, a large number of blocks of data will be recorded on each track, but again, the tracks have been made with a greater angle so they are relatively shortened and the blocks have been made large for illustration purposes so that each track is shown containing only three tape formatted blocks. Information from several blocks of random access storage formatted data is packed into each tape formatted block by an IOU, and the tape blocks are channel encoded and written into the tracks on the tape.

In track 552, block 554 contains the data from blocks V1–V4 of the video file, block A1 of the audio file and block X1 the auxiliary file of FIG. 6. In this particular example, each tape block holds the data from six disk blocks, error detecting and correcting data, and some space 556 in the tape blocks is used to facilitate restoring the data to the disk files, for example, to identify the file for each disk block. The blocks are stored interleaved, as shown, in approximately the same temporal order required for generating a multimedia data stream so that when restoration of the files to the hard drives begin, the disk files very quickly contain sufficient data to allow the production to be played.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims.

We claim:

1. A multimedia storage system with archiving, restoring, and playing, comprising:

a network for multimedia data;

one or more disk controllers for receiving disk formatted multimedia data from the network and transmitting disk formatted multimedia data onto the network;

a multitude of disk units for storing disk formatted data from one of the disk controllers, striped across a plurality of the disk units, and for retrieving disk formatted data from the plurality of disk units to the one disk controller;

a tape controller for receiving tape formatted data from the network, and for transmitting formatted data onto the network;

a group of one or more tape units for storing sequentially formatted data from the tape controller onto removable tape in a process to archive the data, and for retrieving sequentially formatted data from the tape to the tape controller in a process to restore the archived data; and a multimedia network server including:

stream recording means for receiving a stream of multimedia data into the system in real time for recording the multimedia data;

stream playing means for transmitting a stream of multimedia data out of the system for playing the multimedia data for a production in real time;

stream to disk means for converting a stream of multimedia data into disk formatted data;

disk to stream means for converting disk formatted data into a stream of multimedia data;

archiving means for converting the disk formatted data into tape formatted data in a process for archiving the data;

restoring means for converting the tape formatted data into the disk formatted data in a process to restore the archived data;

formatted output means for transferring disk formatted data and tape formatted data onto the network;

formatted input means for receiving disk formatted data and tape formatted data from the network; and archival playing means for converting tape formatted data for a multimedia production into data for a first stream of multimedia data as the stream playing means simultaneously transmits the stream to play the multimedia production in real time, and as the restoring means simultaneously converts the tape formatted data for the multimedia production from sequential access storage formatted data into random access storage formatted data for restoring the multimedia production.

2. A multimedia storage system with archiving, restoring, and playing, comprising:

a network for multimedia data;

a plurality of disk controllers each connected between the network and a respective group of one or more disk drive units;

one or more disk controllers for receiving disk formatted multimedia data from the network and transmitting disk formatted multimedia data onto the network, the network including a commutator for striping disk formatted data for a production across a plurality of the disk controllers;

a multitude of disk units for storing disk formatted data from one of the disk controllers, striped across a plurality of the disk units, and for retrieving disk formatted data from the plurality of disk units to the one disk controller;

a tape controller for receiving tape formatted data from the network, and for transmitting formatted data onto the network;

a group of one or more tape units for storing sequentially formatted data from the tape controller onto removable tape in a process to archive the data, and for retrieving sequentially formatted data from the tape to the tape controller in a process to restore the archived data; and a multimedia network server including:

stream recording means for receiving a stream of multimedia data into the system in real time for recording the multimedia data;

stream playing means for transmitting a stream of multimedia data out of the system for playing the multimedia data for a production in real time;

stream to disk means for converting a stream of multimedia data into disk formatted data;

disk to stream means for converting disk formatted data into a stream of multimedia data;

archiving means for converting the disk formatted data into tape formatted data in a process for archiving the data;

restoring means for converting the tape formatted data into the disk formatted data in a process to restore the archived data;

formatted output means for transferring disk formatted data and tape formatted data onto the network;

formatted input means for receiving disk formatted data and tape formatted data from the network; and archival playing means for converting tape formatted data into data for a first stream of multimedia data as the stream playing means simultaneously transmits the stream to play the first stream of multimedia data in real time, wherein the archival playing means includes means for controlling the restoring means to convert data for a multimedia production from sequential access storage formatted data into random access storage formatted data and simultaneously controlling the disk to stream means to convert disk formatted data for the same production into a stream of multimedia data to permit playing an earlier portion of data for a multimedia production in real time while data for a later portion of the same multimedia production is being converted from sequentially formatted data into disk formatted data, transmitted through the network, striped across the disk controllers and striped across the disk drives connected to each controller.

3. The system of claim 2, in which:

the restoring means include means for converting the sequentially formatted data for a production into the first stream of multimedia data and means for converting the first stream of multimedia data into disk formatted data for the production; and the stream playing means transmits the first data stream onto the network in order to play the first data stream in real time as the first data stream is converted into disk formatted data;

the archiving means includes means to convert the disk formatted data for the production into a second stream of multimedia data and means to convert the second stream of multimedia data into sequentially formatted data; and the stream playing means transmits the second data stream onto the network in order to play the second data stream in real time as the second data stream is converted into sequentially formatted data.

* * * * *